US012602802B2

(12) United States Patent
Park et al.

(10) Patent No.: US 12,602,802 B2
(45) Date of Patent: Apr. 14, 2026

(54) ELECTRONIC DEVICE FOR GENERATING DEPTH MAP AND OPERATING METHOD THEREOF

(71) Applicant: ELECTRONICS AND TELECOMMUNICATIONS RESEARCH INSTITUTE, Daejeon (KR)

(72) Inventors: Jae-Hyuck Park, Daejeon (KR); Kyoung-Wook Min, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 315 days.

(21) Appl. No.: 18/491,916

(22) Filed: Oct. 23, 2023

(65) Prior Publication Data

US 2024/0135564 A1      Apr. 25, 2024
US 2024/0233157 A9      Jul. 11, 2024

(30) Foreign Application Priority Data

Oct. 24, 2022    (KR) ........................ 10-2022-0137677
Oct. 17, 2023    (KR) ........................ 10-2023-0138600

(51) Int. Cl.
*G06T 7/55* (2017.01)
*G01S 17/86* (2020.01)
(Continued)

(52) U.S. Cl.
CPC ............ *G06T 7/55* (2017.01); *G06V 10/7715* (2022.01); *G06T 2207/20221* (2013.01)

(58) Field of Classification Search
CPC ........... G06T 7/55; G06T 2207/20221; G06V 10/7715; G06V 10/454; G06V 10/803; (Continued)

(56) References Cited

U.S. PATENT DOCUMENTS 10,674,077  B2    6/2020   Kim et al.
2015/0332471  A1   11/2015   Heo et al.
(Continued)

OTHER PUBLICATIONS

Yingwei Li et al., "DeepFusion: Lidar-Camera Deep Fusion for Multi-Modal 3D Object Detection", CVF, 2022.
(Continued)

*Primary Examiner* — Jennifer Mehmood
*Assistant Examiner* — Dustin Bilodeau
(74) *Attorney, Agent, or Firm* — LRK PATENT LAW FIRM

(57)      ABSTRACT

Disclosed is a processor which includes a camera image feature extractor that extracts a camera image feature based on a camera image, a LIDAR image feature extractor that extracts a LIDAR image feature based on a LIDAR image, a sampling unit that performs a sampling operation based on the camera image feature and the LIDAR image feature and generates a sampled LIDAR image feature, a fusion unit that fuses the camera image feature and the sampled LIDAR image feature and generates a fusion map, and a decoding unit that decodes the fusion map and generates a depth map. The sampling operation includes back-projecting a pixel location of the camera image feature on a camera coordinate system to generate a back-projection point, and projecting the back-projection point on a plane of the LIDAR image to calculate sampling coordinates.

20 Claims, 7 Drawing Sheets

(51) Int. Cl.
　　*G06V 10/77*　　　　(2022.01)
　　*H04N 13/271*　　　(2018.01)
(58) Field of Classification Search
　　CPC .... G06V 20/58; H04N 13/271; H04N 13/254;
　　　　　　G01S 17/86; G01S 17/894; G01S 17/931;
　　　　　　　　G06N 3/045; G06N 3/0464
　　USPC ........................................................ 382/100
　　See application file for complete search history.

(56)　　　　　　　　References Cited

U.S. PATENT DOCUMENTS

| | | |
|---|---|---|
| 2017/0140552 A1 | 5/2017 | Woo et al. |
| 2019/0065027 A1 | 2/2019 | Hauenstein et al. |
| 2019/0114802 A1 | 4/2019 | Lazarow |
| 2022/0024485 A1* | 1/2022 | Theverapperuma ......................... G01C 21/3635 |
| 2022/0148202 A1 | 5/2022 | Guizilini et al. |
| 2023/0213354 A1* | 7/2023 | Qi ........................... G01S 13/87 701/450 |
| 2023/0351624 A1* | 11/2023 | Ruhkamp ............... G06T 7/529 |
| 2023/0384428 A1* | 11/2023 | Xu ........................... G01S 17/86 |
| 2024/0070541 A1* | 2/2024 | Borse .................... G06N 20/00 |

OTHER PUBLICATIONS

Yoonsu Park et al., "Calibration between Color Camera and 3D LIDAR Instruments with a Polygonal Planar Board", Sensors 2014.

* cited by examiner

FIG. 1

DM[1xHcxWc]

PM[2(D,I)xHcxWc]

CI[3(r,g,b)xHcxWc]

LI[2(D,I)xHIxWI]

FIG. 6

ELECTRONIC DEVICE FOR GENERATING DEPTH MAP AND OPERATING METHOD THEREOF

CROSS-REFERENCE TO RELATED APPLICATIONS

This application claims priority under 35 U.S.C. § 119 to Korean Patent Application No. 10-2022-0137677 filed on Oct. 24, 2022 and Korean Patent Application No. 10-2023-0138600 filed on Oct. 17, 2023, in the Korean Intellectual Property Office, the disclosures of which are incorporated by reference herein in their entireties.

BACKGROUND

1. Field of the Invention

Embodiments of the present disclosure described herein relate to an electronic device for generating a depth map, and more particularly, relate to a method of generating a depth map in a vehicle equipped with a LIDAR (LIght Detection and Ranging) and a camera.

2. Description of Related Art

In autonomous driving technology, it is essential to obtain three-dimensional (3D) information about objects around the vehicle or an ambient environment of the vehicle. In general, stereo depth estimation, monocular depth prediction, depth completion, etc. are being used as a technology for obtaining a depth map (or a distance map) corresponding to a camera image.

The stereo depth estimation is a classic method of measuring a distance based on a disparity between images captured by two cameras. Since the advent of deep learning, the monocular depth estimation that is used to measure a depth through semantic information of a single camera image has been developed. However, because the monocular depth prediction is specialized for predicting a relative distance within an image, it is difficult to accurately measure a depth in units of meter by using the monocular depth prediction.

When an autonomous vehicle (or self-driving car) is equipped with a camera and a LIDAR, there may be used the depth completion technology that uses not only the semantic information of the camera image but also LIDAR points projected on the camera image. The 3D information of the LIDAR points is very accurate, and a depth value of a pixel where a LIDAR point is not formed may be accurately filled by using a result of analyzing the semantic information.

SUMMARY

Embodiments of the present disclosure provide a method of generating a depth map based on a result of extracting a LIDAR image feature by directly using a LIDAR image being raw data of a LIDAR sensor as an input.

Embodiments of the present disclosure provide a sampling method of aligning a LIDAR image feature and a camera image feature, which have different resolutions, so as to be easily fused.

According to an embodiment, a processor includes a camera image feature extractor that extracts a camera image feature based on a camera image, a LIDAR image feature extractor that extracts a LIDAR image feature based on a LIDAR image, a sampling unit that performs a sampling operation based on the camera image feature and the LIDAR image feature and generates a sampled LIDAR image feature, a fusion unit that fuses the camera image feature and the sampled LIDAR image feature and generates a fusion map, and a decoding unit that decodes the fusion map and generates a depth map. The sampling operation includes back-projecting a pixel location of the camera image feature on a camera coordinate system to generate a back-projection point, and projecting the back-projection point on a plane of the LIDAR image to calculate sampling coordinates.

In an embodiment, a resolution of the camera image is different from a resolution of the LIDAR image.

In an embodiment, the camera image feature extractor inputs the camera image to a first artificial intelligence model and extracts the camera image feature based on an output value of the first artificial intelligence model.

In an embodiment, the camera image has a resolution expressed by a product of the number of first pixels in a first direction and the number of second pixels in a second direction, the camera image feature has a resolution expressed by a product of the number of first' pixels in the first direction and the number of second' pixels in the second direction, the number of first' pixels is less than the number of first pixels, and the number of second' pixels is less than the number of second pixels.

In an embodiment, the LIDAR image feature extractor inputs the LIDAR image to a second artificial intelligence model and extracts the LIDAR image feature based on an output value of the second artificial intelligence model.

In an embodiment, the second artificial intelligence model includes a CNN algorithm model.

In an embodiment, the LIDAR image has a resolution expressed by a product of the number of third pixels in a third direction and the number of fourth pixels in a fourth direction, wherein the LIDAR image feature has a resolution expressed by a product of the number of third' pixels in the third direction and the number of fourth' pixels in the fourth direction, the number of third' pixels is less than the number of third pixels, and the number of fourth' pixels is less than the number of fourth pixels.

In an embodiment, a resolution of the LIDAR image feature is different from a resolution of the camera image feature.

In an embodiment, a resolution of the sampled LIDAR image feature is the same as a resolution the camera image feature.

In an embodiment, the sampling unit calculates the sampling coordinates by using sub-pixel sampling.

According to an embodiment, an electronic system includes a camera that obtains a camera image by capturing an ambient environment, a LIDAR that emits light waves of a laser to the ambient environment and obtains a LIDAR image, and an electronic device that generates a depth map based on the camera image and the LIDAR image. The electronic device includes a camera image feature extractor that extracts a camera image feature based on the camera image, a LIDAR image feature extractor that extracts a LIDAR image feature based on the LIDAR image, a sampling unit that performs a sampling operation based on the camera image feature and the LIDAR image feature and generates a sampled LIDAR image feature, a fusion unit that fuses the camera image feature and the sampled LIDAR image feature and generates the fusion map, and a decoding unit that decodes the fusion map and generates a depth map. The sampling operation includes back-projecting a pixel location of the camera image feature on a camera coordinate system to generate a back-projection point, and projecting the back-projection point on a plane of the LIDAR image to calculate sampling coordinates.

In an embodiment, the camera image feature extractor inputs the camera image to a first artificial intelligence model, and extracts the camera image feature based on an output value of the first artificial intelligence model.

In an embodiment, the camera image has a resolution expressed by a product of the number of first pixels in a first direction and the number of second pixels in a second direction, the camera image feature has a resolution expressed by a product of the number of first' pixels in the first direction and the number of second' pixels in the second direction, the number of first' pixels is less than the number of first pixels, and the number of second' pixels is less than the number of second pixels.

In an embodiment, the LIDAR image feature extractor inputs the LIDAR image to a second artificial intelligence model, and extracts the LIDAR image feature based on an output value of the second artificial intelligence model.

In an embodiment, the LIDAR image has a resolution expressed by a product of the number of third pixels in a third direction and the number of fourth pixels in a fourth direction, the LIDAR image feature has a resolution expressed by a product of the number of third' pixels in the third direction and the number of fourth' pixels in the fourth direction, the number of third' pixels is less than the number of third pixels, and the number of fourth' pixels is less than the number of fourth pixels.

In an embodiment, a resolution of the LIDAR image feature is different from a resolution of the camera image feature.

In an embodiment, a resolution of the sampled LIDAR image feature is the same as a resolution the camera image feature.

According to an embodiment, an operation method of an electronic device which includes a camera image feature extractor, a LIDAR image feature extractor, a sampling unit, a fusion unit, and a decoding unit includes extracting, at the camera image feature extractor, a camera image feature based on a camera image, extracting, at the LIDAR image feature extractor, a LIDAR image feature based on a LIDAR image, performing, at the sampling unit, a sampling operation based on the camera image feature and the LIDAR image feature to generate a sampled LIDAR image feature, fusing, at the fusion unit, the camera image feature and the sampled LIDAR image feature to generate a fusion map, and decoding, at the decoding unit, the fusion map to generate a depth map, and the sampling operation includes back-projecting a pixel location of the camera image feature on a camera coordinate system to generate a back-projection point, and projecting the back-projection point on a plane of the LIDAR image to calculate sampling coordinates.

In an embodiment, a resolution of the camera image is different from a resolution of the LIDAR image.

In an embodiment, a resolution of the LIDAR image feature is different from a resolution of the camera image feature.

BRIEF DESCRIPTION OF THE FIGURES

The above and other objects and features of the present disclosure will become apparent by describing in detail embodiments thereof with reference to the accompanying drawings.

FIG. 1 is a diagram illustrating an example of a depth completion network.

FIG. 6 is a diagram for describing a sampling operation in a sampling unit of FIG. 5.

DETAILED DESCRIPTION

Figure 2:
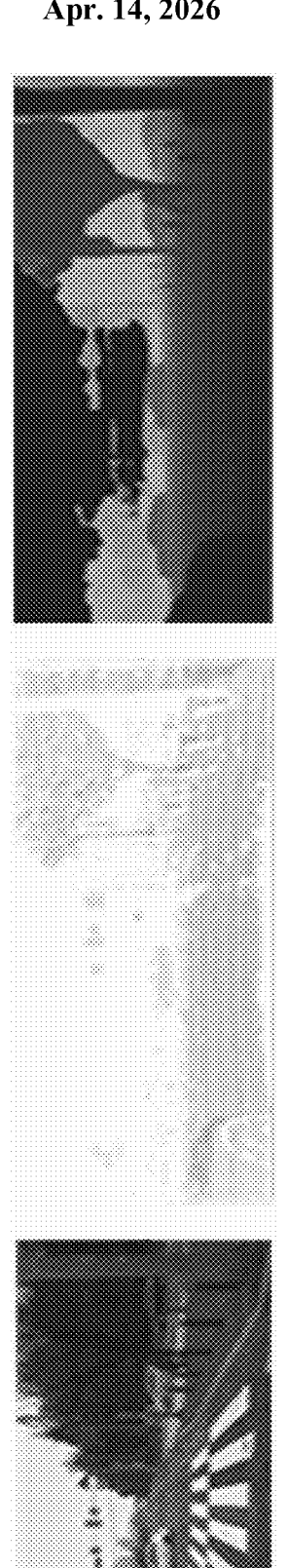
FIG. 2 is a view illustrating an example of a camera image, a LIDAR image, and a depth map described with reference to FIG. 1.
Figure 2:
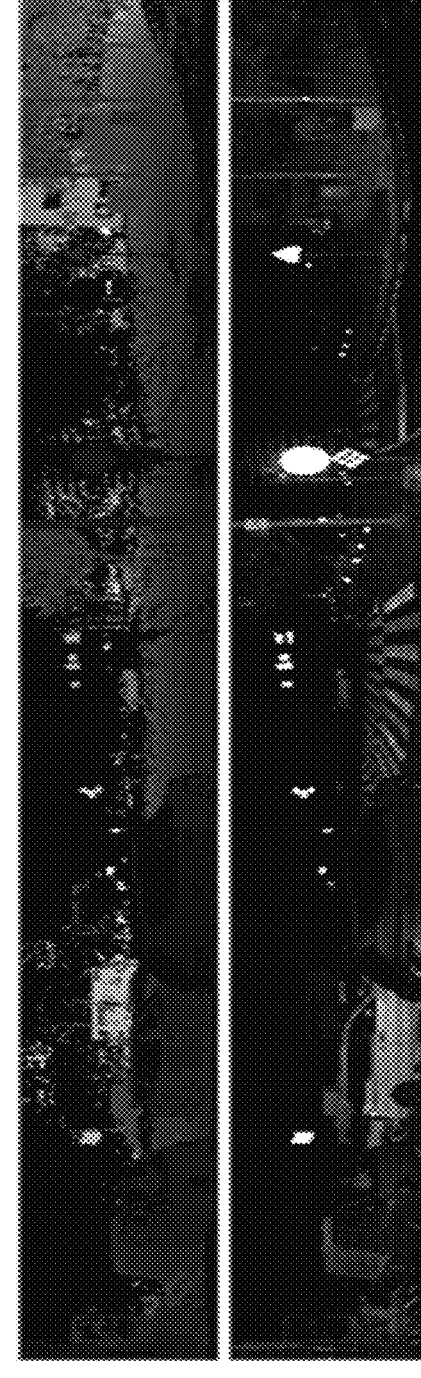

Specific structural or functional descriptions of embodiments according to the concept of the present disclosure disclosed in the specification are only exemplified for the purpose of explaining the embodiments according to the concept of the present disclosure, and the embodiments according to the concept of the present disclosure may be implemented in various forms and are not limited to the embodiments described herein.

Since the embodiments according to the concept of the present disclosure may have various changes and may have various forms, the embodiments will be illustrated in the drawings and will be described in detail herein. However, this is not intended to limit the embodiments according to the concept of the present disclosure to specific disclosed forms and includes all modifications, equivalents, or substitutes included in the spirit and scope of the invention.

Terms such as first or second may be used to describe various elements, but the elements should not be limited by the terms. The above terms are used only for the purpose of distinguishing one element from another, for example, without departing from the scope of the invention, a first element may be referred to as a "second element" and similarly a second element may also be referred to as a "first component".

The terms used herein are used only to describe specific embodiments and are not intended to limit the present disclosure. The articles "a", "an", and "the" are singular in that they have a single referent, but the use of the singular form in the specification should not preclude the presence of more than one referent. In the specification, terms such as "include", "comprise", and "have" are intended to designate that feature, number, step, operation, component, part, or combination thereof described herein exists, but one or more other features should be understood that it does not preclude the possibility of the presence or addition of numbers, steps, operations, components, parts, or combinations thereof.

Unless otherwise defined, all terms including technical and scientific terms used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Below, embodiments of the present disclosure will be described in detail with reference to the accompanying drawings.

Figure 1:
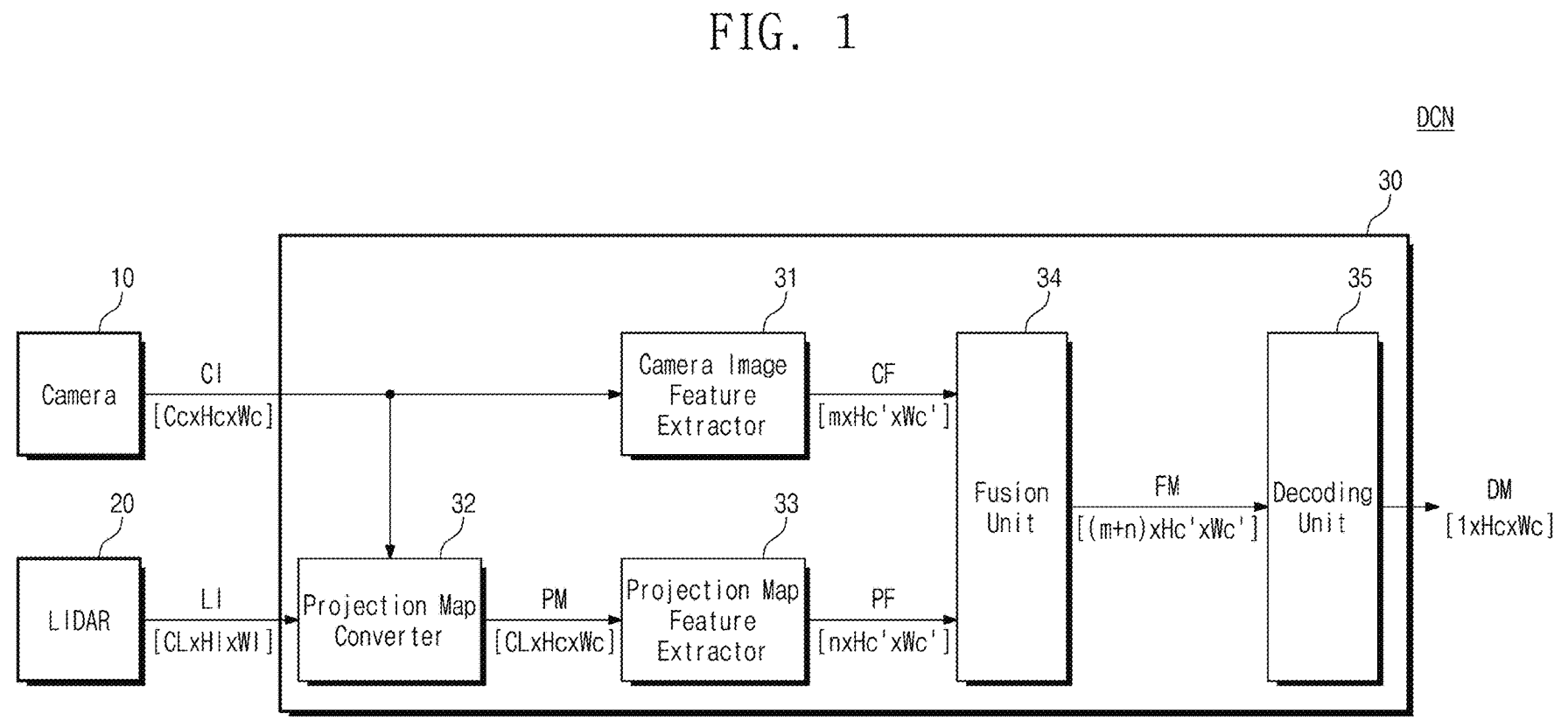
Figure 3:
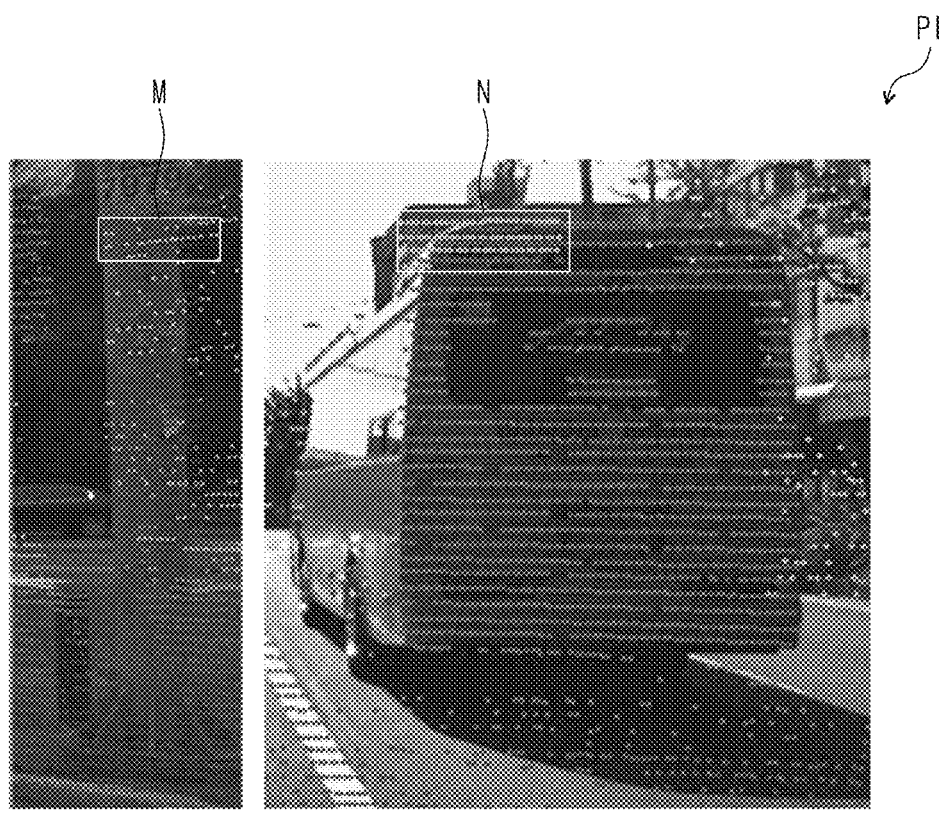
FIG. 3 is a view illustrating an example of a projection map converted by a projection map converter of FIG. 1.

FIG. 1 is a diagram illustrating an example of a depth completion network. FIG. 2 is a view illustrating an example of a camera image, a LIDAR image, and a depth map described with reference to FIG. 1. FIG. 3 is a view illustrating an example of a projection map converted by a projection map converter of FIG. 1.

Referring to FIG. 1, a depth completion network DCN may include a camera 10, a LIDAR (LIght Detection And Ranging) 20, and a network processor 30.

The camera 10 and the LIDAR 20 may be installed in a mobile device to obtain an image of an external environment. For example, the camera 10 and the LIDAR 20 may be installed in a vehicle and may capture an image of an ambient environment when the vehicle is traveling.

The camera 10 may be configured to capture the external environment and to provide an obtained camera image CI to the network processor 30. The camera image CI may include a plurality of camera pixels. The camera image CI may have a resolution of "Hc×Wc" (or expressed by a product of Hc and Wc): Hc indicates the number of first pixels in a first direction and Wc indicates the number of second pixels in a second direction. The first direction may refer to a horizontal direction in the camera 10, and the second direction may refer to a vertical direction in the camera 10.

The number of camera channels Cc of each camera pixel of the camera image CI may be "3", that is, information about three colors, that is, RGB colors may be include in three camera channels as a pixel value. For example, the camera image CI may be a two-dimensional (2D) image. For example, the camera image CI may be expressed by "Cc× Hc×Wc": Cc indicates the number of camera channels, Hc indicates the number of first pixels in the first direction, and Wc indicates the number of second pixels in the second direction.

The LIDAR 20 may be configured to provide the network processor 30 with a LIDAR image LI obtained by emitting a laser to the external environment. The LIDAR image LI may include a plurality of LIDAR pixels. The LIDAR image LI may have a resolution of "Hl×Wl": Hl indicates the number of third pixels in a third direction and Wl indicates the number of fourth pixels in a fourth direction. The third direction may refer to a horizontal direction in the LIDAR 20, and the fourth direction may refer to a vertical direction in the LIDAR 20.

The number of LIDAR channels CL of each LIDAR pixel of the LIDAR image LI may be "2", that is, information about a range and an intensity may be included in two LIDAR channels as a pixel value. For example, the LIDAR image LI may be a 3D image obtained while rotating the laser 360 degrees. For example, the LIDAR image LI may be expressed by "CL×Hl×Wl": CL indicates the number of LIDAR channels, Hl indicates the number of third pixels in the third direction, and Wl indicates the number of fourth pixels in the fourth direction. However, as well as a range and an intensity, additional attributes may be used as a pixel value depending on LIDAR kinds; in this case, the number of LIDAR channels CL may be more than 2.

The network processor 30 is configured to generate a depth map DM based on the camera image CI and the LIDAR image LI. The network processor 30 may include a camera image feature extractor 31, a projection map converter 32, a projection map feature extractor 33, a fusion unit 34, and a decoding unit 35.

The camera image feature extractor 31 may be configured to extract a camera image feature CF based on the camera image CI. For example, the camera image feature extractor 31 may be configured to input the camera image CI to a first artificial intelligence model and to extract the camera image feature CF based on an output value of the first artificial intelligence model. For example, the first artificial intelligence model that is for predicting the camera image feature CF may be generated by training a learning data set composed of a plurality of camera images.

The camera image feature CF may have a resolution of "Hc'×Wc'": Hc' indicates the number of first' pixels in the first direction and Wc' indicates the number of second' pixels in the second direction. Hc' being the number of first' pixels may be less than Hc being the number of first pixels, and Wc' being the number of second' pixels may be less than Wc being the number of second pixels. The number of channel numbers of each pixel of the camera image feature CF may be "m", that is, information about "m" extracted features (m being a natural number) may be included in "m" channels.

The projection map converter 32 may be configured to receive the LIDAR image LI. The projection map converter 32 may be configured to project the LIDAR image LI on the plane of the camera image CI so as to be converted to a LIDAR projection map PM. The LIDAR projection map PM may include a plurality of pixels.

The LIDAR projection map PM may have the resolution of "Hc×Wc": Hc indicates the number of first pixels in the first direction and Wc indicates the number of second pixels in the second direction. For example, the resolution of the LIDAR projection map PM may be the same as the resolution of the camera image CI. Each pixel of the LIDAR projection map PM may have a pixel value of a LIDAR pixel of the LIDAR image LI projected at a location of the corresponding camera pixel of the camera image CI.

The projection map feature extractor 33 may be configured to extract a projection map feature PF based on the LIDAR projection map PM. For example, the projection map feature extractor 33 may be configured to input the LIDAR projection map PM to a second artificial intelligence model and to extract the projection map feature PF based on an output value of the second artificial intelligence model. For example, the second artificial intelligence model that is for predicting the projection map feature PF may be generated by training a learning data set composed of a plurality of LIDAR projection maps PM.

The projection map feature PF may have the resolution of "Hc'×Wc'": Hc' indicates the number of first' pixels in the first direction and Wc' indicates the number of second' pixels in the second direction. Hc' being the number of first' pixels may be less than Hc being the number of first pixels, and Wc' being the number of second' pixels may be less than Wc being the number of second pixels. For example, the resolution of the projection map feature PF may be the same as the resolution of the camera image feature CF. The number of channels of each pixel of the projection map feature PF may be "n", that is, information about "n" features (n being a natural number) may be included in "n" channels.

The fusion unit 34 may be configured to fuse the camera image feature CF and the projection map feature PF and to generate a fusion map FM. As an example, because the camera image feature CF and the projection map feature PF have the same resolution, the pixels of the camera image feature CF may be respectively aligned with the pixels of the projection map feature PF. The fusion unit 34 may generate the fusion map FM by performing a CONCAT operation or a sum operation with respect to pixel values of the camera image feature CF and the projection map feature PF, which are at the same location.

The fusion map FM may have the resolution of "Hc'× Wc'": Hc' indicates the number of first' pixels in the first direction and Wc' indicates the number of second' pixels in the second direction. For example, the resolution of the fusion map FM may be the same as the resolution of the camera image feature CF or the resolution of the projection map feature PF. The number of channels of each pixel of the fusion map FM may be "m+n": "m" indicates the number of channels of the camera image feature CF and "n" indicates the number of channels of the projection map feature PF.

The decoding unit 35 may be configured to decode the fusion map FM and to generate the depth map DM. For example, the decoding unit 35 may be configured to generate the depth map DM by decoding the fusion map FM such that the number of channels decreases and a resolution increases.

The depth map DM may have the resolution of "Hc×Wc": Hc indicates the number of first pixels in the first direction and Wc indicates the number of second pixels in the second direction. For example, the resolution of the depth map DM may be the same as the resolution of the camera image CI. Each pixel of the depth map DM may have one channel including information about a depth.

Referring to FIGS. 1 and 2, the camera image CI may have three channels under the assumption that RGB inputs are provided, the LIDAR projection map PM may have two channels under the assumption that a range input and an intensity input are provided, and the depth map DM may have a single channel. However, the present disclosure is not limited thereto. For example, a camera and/or a LIDAR sensor may provide more channels, or the number of channels of data that are input to an artificial intelligence model may be increased by calculating a new channel value based on default channel values.

According to the configuration illustrated in FIG. 1, after the LIDAR image LI is converted to the LIDAR projection map PM, the depth map DM may be generated based on the projection map feature PF and the camera image feature CF. In this case, the fusion may be simply made, but the configuration illustrated in FIG. 1 may have the following issues.

As the first issue, separate pre-processing logic (e.g., the projection map converter 32 of FIG. 1) is required to convert data of the LIDAR image LI to the LIDAR projection map PM. The pre-processing process is as follows.

The LIDAR provides the data of the LIDAR image LI. The pre-processing logic may calculate a 3D point cloud on the LIDAR coordinate system through the back-projection based on a range of each pixel. When an extrinsic parameter EP being a location relationship between the LIDAR 20 and the camera 10 and an intrinsic parameter IP_C of the camera 10 are given, the pre-processing logic may project the point cloud on the plane of the camera image CI.

As the second issue, the LIDAR projection map PM has a sparse characteristic that there are lots of empty pixels. The performance of typical neural network layers associated with sparse inputs is poor. In particular, a front part of a convolutional neural network (CNN) that is mainly used as a feature extractor plays a role in extracting a local feature of an input and has a difficulty in extracting a good feature when the number of meaningful pixels in an area is insufficient. The above issue may be solved by increasing the numbers of layers of the network or by using a modified layer capable of coping with a sparse input.

As the third issue, due to a difference between locations where the camera 10 and the LIDAR 20 are installed, points formed at hidden locations from the camera point of view appear in the LIDAR projection map PM. Referring to area M in FIG. 3, it is confirmed that some of points of a distant tree or the ground are formed on a nearby electric (or telephone) pole. Referring to area N of FIG. 3, it is confirmed that some of points of a distant sign are formed on a nearby bus. As such, it is an additional need to design and train the network such that information about unreliable points is screened out and is not followed.

As the final issue, a multi-camera environment in which a plurality of camera images CI are received from a plurality of cameras causes inefficiency. To provide omnidirectional observation, a large number of cameras are installed in an autonomous vehicle. According to a configuration in which a single LIDAR sensor observing 360 degrees and a plurality of cameras are installed, even though a single LIDAR sensor is used, an LIDAR image is projected on the plane of each of the plurality of camera images CI, and a feature is individually extracted after generating the LIDAR projection map PM for each camera. This means that the configuration in which a single LIDAR and a plurality of cameras are installed is inefficient.

The present disclosure for solving the above issues will be described with reference to FIG. 4.

Figure 4:
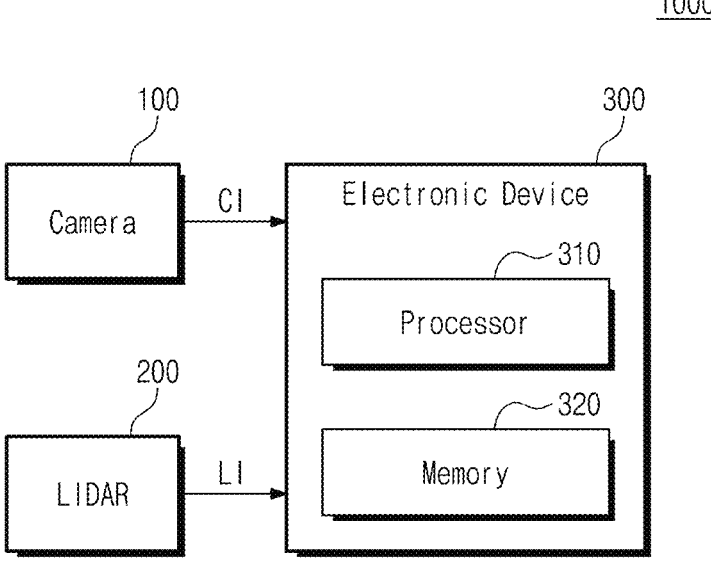
FIG. 4 is a diagram illustrating an electronic system according to an embodiment of the present disclosure.

FIG. 4 is a diagram illustrating an electronic system according to an embodiment of the present disclosure.

Referring to FIG. 4, an electronic system 1000 may include a camera 100, a LIDAR 200, and an electronic device 300. Below, additional description associated with components that are substantially the same as the components described with reference to FIG. 1 will be omitted to avoid redundancy, and a difference will be mainly described.

The camera 100 and the LIDAR 200 may be installed in a mobile device to obtain an image of an external environment. For example, the camera 100 and the LIDAR 200 may be installed in a vehicle and may capture an image of an ambient environment when the vehicle is traveling. The electronic device 300 may be installed within a vehicle, but the present disclosure is not limited thereto. For example, the electronic device 300 may be implemented in a server outside the vehicle.

The camera 100 may be configured to capture the external environment and to provide the obtained camera image CI to the electronic device 300. For example, the camera 100 may be configured to capture an ambient environment of the vehicle and to generate the camera image CI. The camera 100 may be substantially the same as the camera 10 described with reference to FIG. 1.

The LIDAR 200 may be configured to provide the electronic device 300 with the LIDAR image LI obtained by emitting a laser to the external environment. The LIDAR 200 may be substantially the same as the LIDAR 20 described with reference to FIG. 1. However, the present disclosure is not limited to the LIDAR 200. For example, it may be understood that the present disclosure is capable of being applied to a technology for generating a depth map through the fusion of a camera image and an image whose resolution is different from a resolution of the camera image and in which the number of channels is different from that of the camera image in the number of channels, like a RADAR (RAdio Detection And Ranging).

The electronic device 300 may be configured to generate the depth map DM based on the camera image CI and the LIDAR image LI.

The electronic device 300 may include a processor 310 and a memory 320. The processor 310 may be configured to generate the depth map DM, and the memory 320 may be configured to store various kinds of data that are used in the operation of the processor 310.

Below, a configuration and an operation of the processor 310 will be described in detail with reference to FIG. 5.

Figure 5:
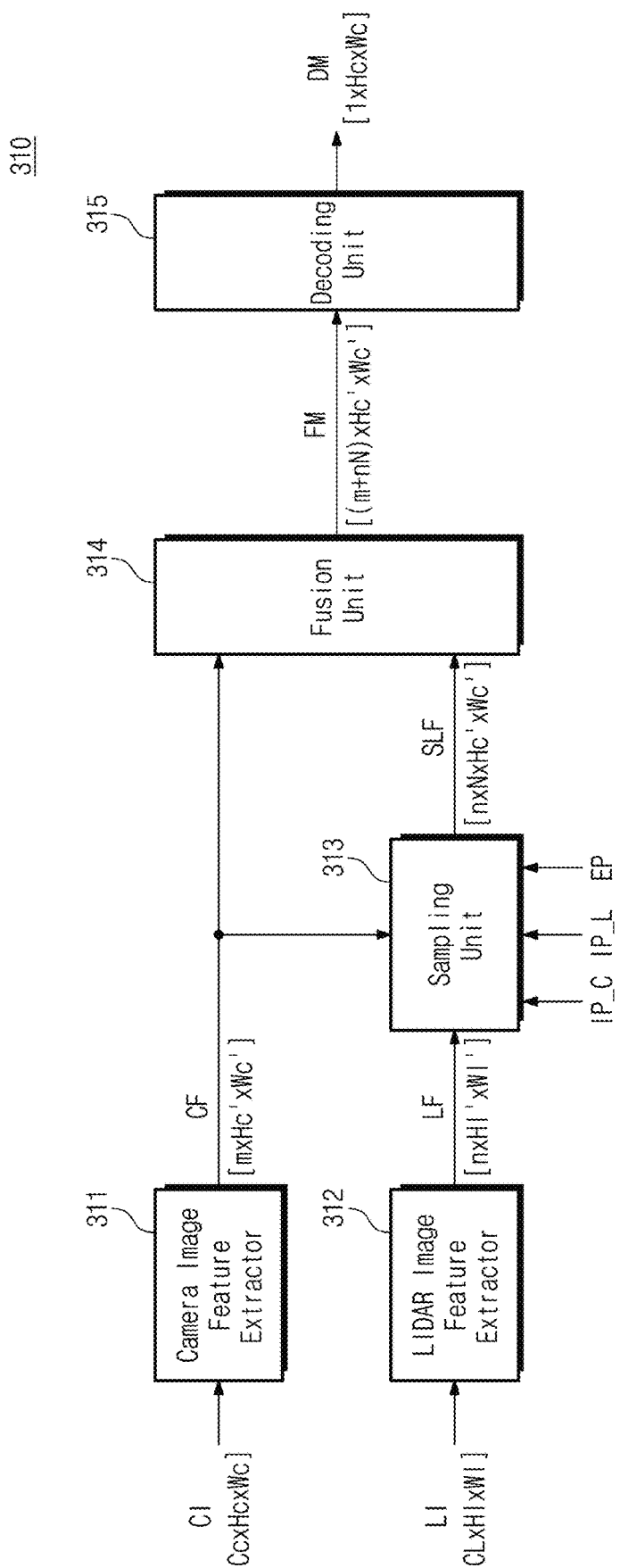
FIG. 5 is a diagram illustrating an example of a processor of FIG. 4.
Figure 6:
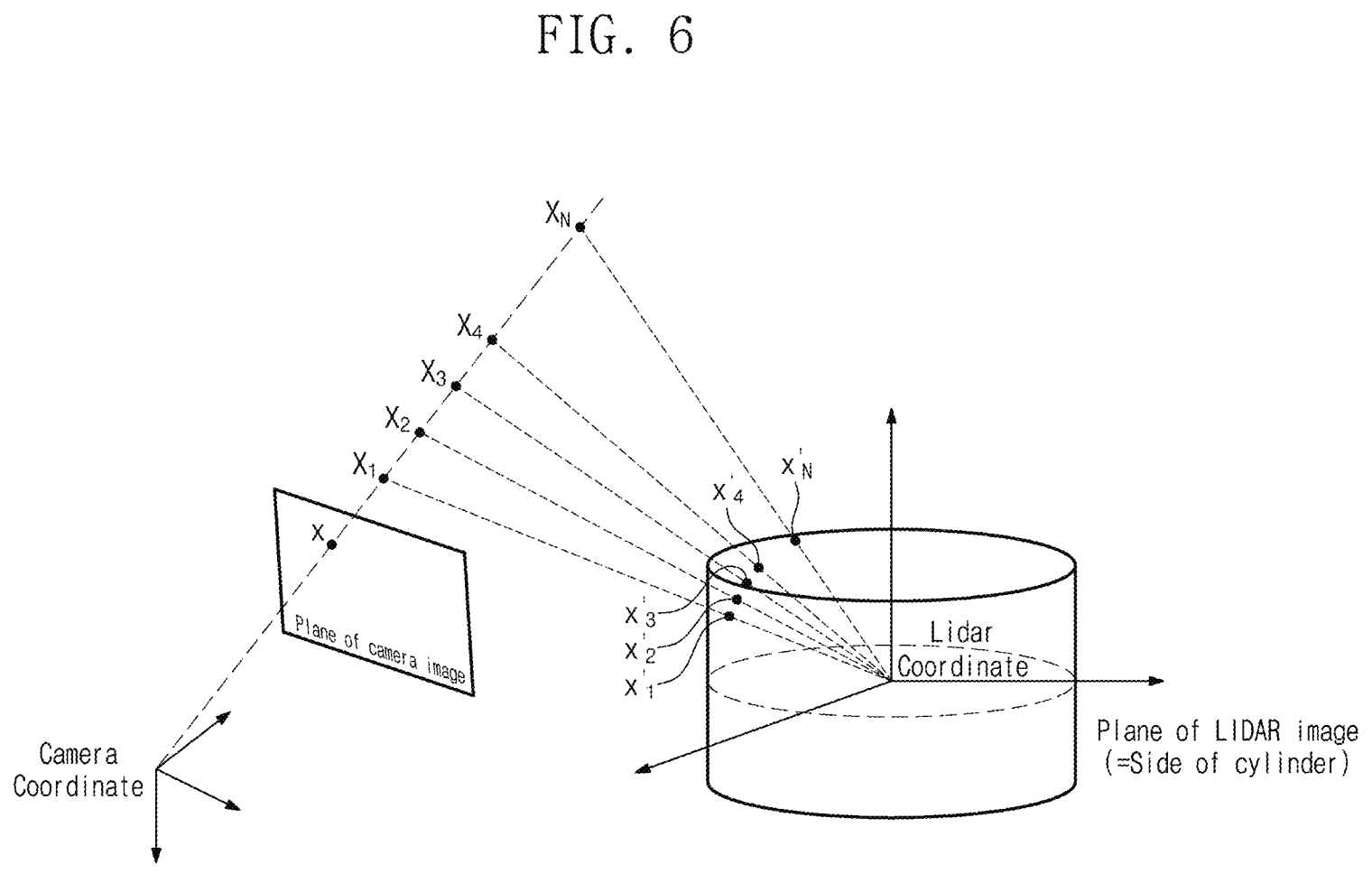

FIG. 5 is a diagram illustrating an example of a processor of FIG. 4. FIG. 6 is a diagram for describing a sampling operation in a sampling unit of FIG. 5.

Referring to FIGS. 5 and 6, the processor 310 may include a camera image feature extractor 311, a LIDAR image feature extractor 312, a sampling unit 313, a fusion unit 314, and a decoding unit 315.

The camera image feature extractor 311 may be configured to extract the camera image feature CF based on the camera image CI. The camera image feature extractor 311 may be substantially the same as the camera image feature extractor 31 described with reference to FIG. 1.

The camera image CI may include a plurality of camera pixels. The camera image CI may have the resolution of "HcxWc": Hc indicates the number of first pixels in the first direction and Wc indicates the number of second pixels in the second direction. The camera image CI may be expressed by "CcxHcxWc": Cc indicates the number of camera channels, Hc indicates the number of first pixels in the first direction, and Wc indicates the number of second pixels in the second direction.

The camera image feature CF may have the resolution of "Hc'xWc'": Hc' indicates the number of first' pixels in the first direction and Wc' indicates the number of second' pixels in the second direction. Hc' being the number of first' pixels may be less than Hc being the number of first pixels, and Wc' being the number of second' pixels may be less than Wc being the number of second pixels. The number of channels of each pixel of the camera image feature CF may be "m", that is, information about "m" extracted features may be included in "m" channels.

The LIDAR image feature extractor 312 may be configured to extract a LIDAR image feature LF based on the LIDAR image LI. For example, the LIDAR image feature extractor 312 may be configured to input the LIDAR image LI to a third artificial intelligence model and to extract the LIDAR image feature LF based an output value of the third artificial intelligence model. For example, the third artificial intelligence model that is for predicting the LIDAR image feature LF may be generated by training a learning data set composed of a plurality of LIDAR images LI.

In an embodiment, the third artificial intelligence model may include KNN (K-Nearest Neibors), linear regression, logistic regression, SVM (Support Vector Machines), decision tree, random forest, or a neural network algorithm model such as CNN (Convolutional neural network), RNN (Recurrent neural network), or SVR (Support vector regression).

The LIDAR image LI may include a plurality of LIDAR pixels. The LIDAR image LI may have the resolution of "HlxWl": Hl indicates the number of third pixels in the third direction and Wl indicates the number of fourth pixels in the fourth direction. The third direction may refer to an angle of a horizontal direction in the LIDAR 200, and the fourth direction may refer to a channel of a vertical direction in the LIDAR 200.

The number of LIDAR channels CL of each LIDAR pixel of the LIDAR image LI may be "2", that is, information about a range and an intensity may be included in two LIDAR channels as a pixel value. For example, the LIDAR image LI may be expressed by "CLxHlxWl": CL indicates the number of LIDAR channels, Hl indicates the number of third pixels in the third direction, and Wl indicates the number of fourth pixels in the fourth direction.

The LIDAR image feature LF may have the resolution of "Hl'xWl'": Hl indicates the number of third' pixels in the third direction and Wl' indicates the number of fourth' pixels in the fourth direction. Hl' being the number of third' pixels may be less than Hl being the number of third pixels, and Wl' being the number of fourth' pixels may be less than Wl being the number of fourth pixels. The number of channels of each pixel of the LIDAR image feature LF may be "n", that is, information about "n" extracted features may be included in "n" channels.

Because the camera image feature CF and the LIDAR image feature LF have different resolutions and are not aligned, it is impossible to fuse the camera image feature CF and the LIDAR image feature LF by using a simple method.

The sampling unit 313 may be configured to perform a sampling operation based on the camera image feature CF and the LIDAR image feature LF and to generate a sampled LIDAR image feature SLF. The sampling unit 313 may be configured to perform the sampling operation such that the sampled LIDAR image feature SLF is aligned with camera image CI.

Below, the sampling operation performed by the sampling unit 313 will be described with reference to FIG. 6.

Referring to FIGS. 5 and 6, the sampling unit 313 may be configured to generate "N" back-projection points $X_1$ to $X_N$ by back-projecting a location of each pixel of the camera image feature CF on the camera coordinate system based on the intrinsic parameter IP_C. The camera coordinate system may be a 3D coordinate system where the camera 100 is located at the origin. A distance from the origin to each back-projection point and the number of back-projection points "N" are parameters that are capable of being adjusted in a design process.

The sampling unit 313 may be configured to change the back-projection points $X_1$ to $X_N$ from the camera coordinate system to the LIDAR coordinate system, in which the LIDAR 200 is located at the origin, based on the extrinsic parameter EP between the camera 100 and the LIDAR 200.

The sampling unit 313 may be configured to calculate sampling coordinates x' 1 to x'N that are formed by projecting the back-projection points changed based on the LIDAR coordinate system on the plane of the LIDAR image LI through a LIDAR intrinsic parameter IP_L. The plane of the LIDAR image LI may be a plane corresponding to the LIDAR image LI. Because the LIDAR obtains the LIDAR image LI while rotating 360 degrees, the plane of the LIDAR image LI may correspond to the side of a cylinder.

The sampling unit 313 may be configured to calculate sampling coordinates $x'_1$ to $x'_N$ of the respective pixels of the camera image feature CF based on the LIDAR image feature LF corresponding to the sampling coordinates $x'_1$ to $x'_N$.

When the sampling coordinates on the plane of the LIDAR image LI does not accurately correspond to the pixel value of the LIDAR image feature LF, the sampling unit 313 may calculate the sampling coordinates by using sub-pixel sampling such as bilinear sampling. Because the sub-pixel sampling is capable of being implemented with a differentiable neural network layer, the end-to-end learning may be possible.

As in the above manner, the sampling unit 313 may be configured to generate the sampled LIDAR image feature SLF by performing the sampling operation with respect to all the pixels of the camera image feature CF. The sampled LIDAR image feature SLF may be expressed by "nxNxHc'x Wc'": n indicates the number of channels, N indicates the number of sampling coordinates, Hc' indicates the number of first' pixels in the first direction, and Wc' indicates the number of second' pixels in the second direction.

The fusion unit 314 may be configured to generate the fusion map FM by fusing the sampled LIDAR image LI and the camera image CI. Because the sampled LIDAR image feature SLF is aligned with the camera image feature CF, the fusion may be easily made.

For example, the fusion unit 314 may connect the "N" sampling coordinates in a channel direction in the sampled LIDAR image feature SLF and thus may change the sampled LIDAR image feature SLF so as to have the same resolution as the camera image feature CF. The fusion unit 314 may connect the changed sampled LIDAR image feature SLF and the camera image feature CF in a channel direction.

As another example, without using the sampled LIDAR image feature SLF directly for fusion, the fusion unit 314 may extract an additional feature by allowing the sampled LIDAR image feature SLF to pass through the 3D CNN or a layer of an attention structure and may then perform the fusion with the camera image feature CF.

The fusion map FM may have the resolution of "Hc'× Wc'": Hc' indicates the number of first' pixels in the first direction and Wc' indicates the number of second' pixels in the second direction. For example, the resolution of the fusion map FM may be the same as the resolution of the camera image feature CF. The number of channels of each pixel of the fusion map FM may be "m+nN": m indicates the number of channels, n indicates the number of LIDAR image features of the sampled LIDAR image feature SLF, and N indicates the number of sampling coordinates.

The decoding unit 315 may be configured to decode the fusion map FM and to generate the depth map DM. For example, the decoding unit 315 may be configured to generate the depth map DM by decoding the fusion map FM such that the number of channels decreases and a resolution increases.

The depth map DM may have the resolution of "Hc×Wc": Hc indicates the number of first pixels in the first direction and Wc indicates the number of second pixels in the second direction. For example, the resolution of the depth map DM may be the same as the resolution of the camera image CI. Each pixel of the depth map DM may have one channel including information about a depth.

According to the present disclosure, separate pre-processing logic for converting a LIDAR image to a LIDAR projection map is not required. Because there is no need to generate a LIDAR projection map for each camera image, the amount of computation may decrease.

According to the present disclosure, because a LIDAR image is directly used in the artificial intelligence model instead of a LIDAR projection map having a sparse characteristic, the accuracy of feature extraction may be improved.

According to the present disclosure, because calculation for determining whether to perform sampling at any point of the plane of the LIDAR image LI is initially once performed for each pixel location of the plane of the camera image CI, there is no additional burden of network learning and inference.

According to the present disclosure, because the fusion with each camera image is made by extracting the LIDAR image feature once even in the environment where a plurality of cameras are used, and the total amount of computation may decrease.

Figure 7:
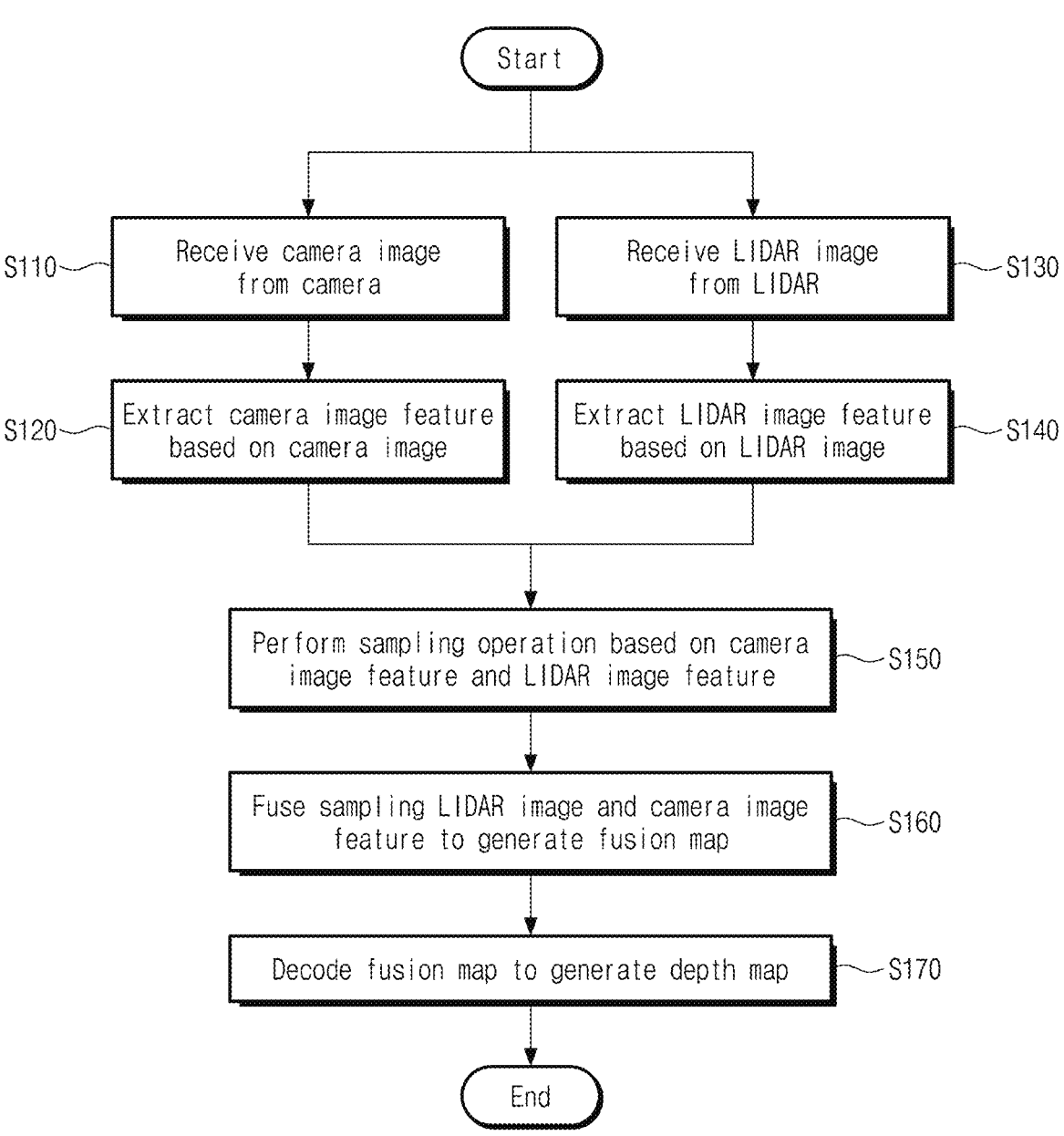
FIG. 7 is a diagram illustrating an operating method of a processor according to an embodiment of the present disclosure.

FIG. 7 is a diagram illustrating an operating method of a processor according to an embodiment of the present disclosure. Below, an operating method of a processor will be described with reference to FIGS. 5 and 6.

Referring to FIGS. 5, 6, and 7, in operation S110, the processor 310 may receive the camera image CI from the camera 100. The camera image CI received from the camera 100 may be provided to the camera image feature extractor 311.

In operation S120, the camera image feature extractor 311 may extract the camera image feature CF based on the camera image CI.

In operation S130, the processor 310 may receive the LIDAR image LI from the LIDAR 200. The LIDAR image LI received from the LIDAR 200 may be provided to the LIDAR image feature extractor 312. Operation S110 and operation S130 may be performed simultaneously. In other words, the camera image CI and the LIDAR image LI may be provided to the processor 310 in real time from the camera 100 and the LIDAR 200 installed in the mobile device.

In operation S140, the LIDAR image feature extractor 312 may extract the LIDAR image feature LF based on the LIDAR image LI. Operation S120 and operation S140 may be performed simultaneously, but the present disclosure is not limited thereto. For example, operation S120 and operation S140 may be performed in an order different from the above order.

In operation S150, the sampling unit 313 may perform the sampling operation based on the camera image feature CF and the LIDAR image feature LF and may generate the sampled LIDAR image feature SLF.

In operation S160, the fusion unit 314 may generate the fusion map FM by fusing the sampled LIDAR image SLF and the camera image feature CF In operation S170, the decoding unit 315 may decode the fusion map FM to generate the depth map DM.

According to an embodiment of the present disclosure, there is provided a method of generating a depth map based on a result of extracting a LIDAR image feature by directly using a LIDAR image being raw data of a LIDAR sensor as an input.

According to an embodiment of the present disclosure, there is a sampling method of aligning a LIDAR image feature and a camera image feature, which have different resolutions, so as to be easily fused.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A processor comprising:
a camera image feature extractor configured to extract a camera image feature based on a camera image, wherein the camera image is received from a camera;
a Light Detection and Ranging (LIDAR) image feature extractor configured to extract a LIDAR image feature based on a LIDAR image, wherein the LIDAR image is received from a LIDAR;
a sampling unit configured to generate a sampled LIDAR image feature by performing a sampling operation based on the camera image feature and the LIDAR image feature;
a fusion unit configured to generate a fusion map by fusing the camera image feature and the sampled LIDAR image feature; and
a decoding unit configured to generate a depth map by decoding the fusion map and, wherein the sampling operation includes:

determining a back-projection ray corresponding to a pixel location of the camera image feature by using intrinsic parameters of the camera;

generating a plurality of three-dimensional sample points on the back-projection ray in a camera coordinate system;

transforming the plurality of three-dimensional sample points from the camera coordinate system to a LIDAR coordinate system by using extrinsic parameters between the camera and the LIDAR;

projecting, using intrinsic parameters of the LIDAR, each of the transformed three-dimensional sample points onto a two-dimensional LIDAR image plane to obtain sampling coordinates; and sampling the LIDAR image feature at the sampling coordinates to generate the sampled LIDAR image feature.

2. The processor of claim 1, wherein a resolution of the camera image is different from a resolution of the LIDAR image.

3. The processor of claim 1, wherein the camera image feature extractor is configured to:

input the camera image to a first artificial intelligence model; and extract the camera image feature based on an output value of the first artificial intelligence model.

4. The processor of claim 3, wherein the camera image has a resolution expressed by a product of the number of first pixels in a first direction and the number of second pixels in a second direction, wherein the camera image feature has a resolution expressed by a product of the number of first' pixels in the first direction and the number of second' pixels in the second direction, wherein the number of first' pixels is less than the number of first pixels, and wherein the number of second' pixels is less than the number of second pixels.

5. The processor of claim 4, wherein the LIDAR image feature extractor is configured to:

input the LIDAR image to a second artificial intelligence model; and extract the LIDAR image feature based on an output value of the second artificial intelligence model.

6. The processor of claim 5, wherein the second artificial intelligence model includes a CNN algorithm model.

7. The processor of claim 5, wherein the LIDAR image has a resolution expressed by a product of the number of third pixels in a third direction and the number of fourth pixels in a fourth direction, wherein the LIDAR image feature has a resolution expressed by a product of the number of third' pixels in the third direction and the number of fourth' pixels in the fourth direction, wherein the number of third' pixels is less than the number of third pixels, and wherein the number of fourth' pixels is less than the number of fourth pixels.

8. The processor of claim 7, wherein a resolution of the LIDAR image feature is different from a resolution of the camera image feature.

9. The processor of claim 1, wherein a resolution of the sampled LIDAR image feature is the same as a resolution the camera image feature.

10. The processor of claim 1, wherein the sampling unit is configured to:

calculate the sampling coordinates by using sub-pixel sampling.

11. An electronic system comprising:

a camera configured to obtain a camera image by capturing an ambient environment;

a Light Detection and Ranging (LIDAR) configured to emit a laser to the ambient environment and to obtain a LIDAR image; and an electronic device configured to generate a depth map based on the camera image and the LIDAR image, wherein the electronic device includes:

a camera image feature extractor configured to extract a camera image feature based on the camera image;

a LIDAR image feature extractor configured to extract a LIDAR image feature based on the LIDAR image;

a sampling unit configured to perform a sampling operation based on the camera image feature and the LIDAR image feature and to generate a sampled LIDAR image feature;

a fusion unit configured to fuse the camera image feature and the sampled LIDAR image feature and to generate the fusion map; and a decoding unit configured to decode the fusion map and to generate a depth map, wherein the sampling operation includes:

determining a back-projection ray corresponding to a pixel location of the camera image feature by using intrinsic parameters of the camera;

generating a plurality of three-dimensional sample points on the back-projection ray in a camera coordinate system;

transforming the plurality of three-dimensional sample points from the camera coordinate system to a LIDAR coordinate system by using extrinsic parameters between the camera and the LIDAR;

projecting, using intrinsic parameters of the LIDAR, each of the transformed three-dimensional sample points onto a two-dimensional LIDAR image plane to obtain sampling coordinates; and sampling the LIDAR image feature at the sampling coordinates to generate the sampled LIDAR image feature.

12. The electronic system of claim 11, wherein the camera image feature extractor is configured to:

input the camera image to a first artificial intelligence model; and extract the camera image feature based on an output value of the first artificial intelligence model.

13. The electronic system of claim 12, wherein the camera image has a resolution expressed by a product of the number of first pixels in a first direction and the number of second pixels in a second direction, wherein the camera image feature has a resolution expressed by a product of the number of first' pixels in the first direction and the number of second' pixels in the second direction, wherein the number of first' pixels is less than the number of first pixels, and wherein the number of second' pixels is less than the number of second pixels.

14. The electronic system of claim 13, wherein the LIDAR image feature extractor is configured to:

input the LIDAR image to a second artificial intelligence model; and extract the LIDAR image feature based on an output value of the second artificial intelligence model.

15. The electronic system of claim 14, wherein the LIDAR image has a resolution expressed by a product of the number of third pixels in a third direction and the number of fourth pixels in a fourth direction, wherein the LIDAR image feature has a resolution expressed by a product of the number of third' pixels in the third direction and the number of fourth' pixels in the fourth direction, wherein the number of third' pixels is less than the number of third pixels, and wherein the number of fourth' pixels is less than the number of fourth pixels.

16. The electronic system of claim 11, wherein a resolution of the LIDAR image feature is different from a resolution of the camera image feature.

17. The electronic system of claim 11, wherein a resolution of the sampled LIDAR image feature is the same as a resolution the camera image feature.

18. An operation method of an electronic device which includes a camera image feature extractor, a LIght Detection and Ranging (LIDAR) image feature extractor, a sampling unit, a fusion unit, and a decoding unit, the operation method comprising:

extracting, at the camera image feature extractor, a camera image feature based on a camera image, wherein the camera image is received from a camera;

extracting, at the LIDAR image feature extractor, a LIDAR image feature based on a LIDAR image, wherein the LIDAR image is received from a LIDAR;

performing, at the sampling unit, a sampling operation based on the camera image feature and the LIDAR image feature to generate a sampled LIDAR image feature;

fusing, at the fusion unit, the camera image feature and the sampled LIDAR image feature to generate a fusion map; and decoding, at the decoding unit, the fusion map to generate a depth map, wherein the sampling operation includes:

determining a back-projection ray corresponding to a pixel location of the camera image feature by using intrinsic parameters of the camera;

generating a plurality of three-dimensional sample points on the back-projection ray in a camera coordinate system;

transforming the plurality of three-dimensional sample points from the camera coordinate system to a LIDAR coordinate system by using extrinsic parameters between the camera and the LIDAR;

projecting, using intrinsic parameters of the LIDAR, each of the transformed three-dimensional sample points onto a two-dimensional LIDAR image plane to obtain sampling coordinates; and sampling the LIDAR image feature at the sampling coordinates to generate the sampled LIDAR image feature.

19. The operation method of claim 18, wherein a resolution of the camera image is different from a resolution of the LIDAR image.

20. The operation method of claim 18, wherein a resolution of the LIDAR image feature is different from a resolution of the camera image feature.

* * * * *